US009955531B2

(12) United States Patent
Kang et al.

(10) Patent No.: US 9,955,531 B2
(45) Date of Patent: Apr. 24, 2018

(54) MANUFACTURING METHOD OF PTC ELEMENT USING POLYMER AQUEOUS EMULSION CONDUCTIVE COMPOSITE, PTC ELEMENT MANUFACTURED BY MANUFACTURING METHOD, AND PLANAR HEATING ELEMENT INCLUDING PTC ELEMENT

(71) Applicant: UNIPLATEK CO., LTD., Daejeon (KR)

(72) Inventors: Suk Hwan Kang, Daejeon (KR); Jong Bok Nah, Daejeon (KR); Jeong Ha Won, Daejeon (KR)

(73) Assignee: Suk Hwan Kang, Daejeon (KR)

( * ) Notice: Subject to any disclaimer, the term of this patent is extended or adjusted under 35 U.S.C. 154(b) by 253 days.

(21) Appl. No.: 14/603,649

(22) Filed: Jan. 23, 2015

(65) Prior Publication Data

US 2015/0373782 A1 Dec. 24, 2015

(30) Foreign Application Priority Data

Jun. 18, 2014 (KR) ........................ 10-2014-0074494

(51) Int. Cl.
*H01G 5/38* (2006.01)
*H01G 9/02* (2006.01)
(Continued)

(52) U.S. Cl.
CPC ............ *H05B 3/146* (2013.01); *D06M 15/00* (2013.01); *H05B 3/34* (2013.01); (Continued)

(58) Field of Classification Search
None
See application file for complete search history.

(56) References Cited

U.S. PATENT DOCUMENTS 5,378,407 A * 1/1995 Chandler ................. C08K 7/06 252/512
6,229,123 B1 * 5/2001 Kochman .......... A41D 13/0051 219/529
(Continued)

FOREIGN PATENT DOCUMENTS

JP 5026035 B2 9/2012
KP 10-2011-0104247 * 9/2011
(Continued)

OTHER PUBLICATIONS

Korean Office Action dated Aug. 17, 2015.

*Primary Examiner* — David Angwin
*Assistant Examiner* — Gyounghyun Bae
(74) *Attorney, Agent, or Firm* — Rabin & Berdo, P.C.

(57) ABSTRACT

A manufacturing method of a PTC (Positive Temperature Coefficient) element includes: producing a polymer aqueous emulsion solution; producing a polymer aqueous emulsion conductive composite by mixing the polymer aqueous emulsion solution with a conductive agent; and producing the PTC element by coating a substrate with the polymer aqueous emulsion conductive composite, or print the polymer aqueous emulsion conductive composite on the substrate, or dipping the substrate in the polymer aqueous emulsion conductive composite and drying the substrate. Here, the polymer aqueous emulsion solution includes an adhesive polymer, a cross-linking agent, an initiator, and water. The substrate is film, non-woven, textile, inflexible plate, and the like, which are formed of polymer resin.

12 Claims, 4 Drawing Sheets

(51) Int. Cl.
*H05B 3/14* (2006.01)
*D06M 15/00* (2006.01)
*H05B 3/34* (2006.01)

(52) U.S. Cl.
CPC .. *H05B 2203/011* (2013.01); *H05B 2203/013* (2013.01); *H05B 2203/02* (2013.01)

(56) References Cited

U.S. PATENT DOCUMENTS

| | | | | |
|---|---|---|---|---|
| 6,720,539 | B2 * | 4/2004 | DeAngelis | D02G 3/441 219/545 |
| 8,507,831 | B2 * | 8/2013 | Howick | B60N 2/5678 219/210 |
| 8,536,496 | B2 * | 9/2013 | Ptasienski | B29C 45/2737 219/476 |
| 8,562,871 | B2 * | 10/2013 | Khatua | C04B 35/4682 219/209 |
| 9,034,210 | B2 * | 5/2015 | Ihle | C04B 35/468 252/500 |
| 9,257,703 | B2 * | 2/2016 | Sekine | C08F 220/42 |
| 2002/0010256 | A1 * | 1/2002 | Reski | B42C 9/0006 524/502 |
| 2003/0219960 | A1 * | 11/2003 | Fukumoto | C09J 7/0264 438/459 |
| 2004/0232387 | A1 * | 11/2004 | Kim | H01C 7/027 252/500 |
| 2004/0242770 | A1 * | 12/2004 | Feldstein | A61K 8/0208 525/54.3 |
| 2005/0173414 | A1 * | 8/2005 | Ishii | H01C 1/01 219/549 |
| 2007/0224395 | A1 * | 9/2007 | Rowitsch | C09J 5/00 428/143 |
| 2008/0128101 | A1 * | 6/2008 | Furman | D21H 21/22 162/158 |
| 2008/0314292 | A1 * | 12/2008 | Shimanaka | C09D 4/00 106/505 |
| 2010/0038356 | A1 * | 2/2010 | Fukuda | H01C 7/021 219/549 |
| 2011/0084060 | A1 * | 4/2011 | Kang | B29C 35/0866 219/494 |
| 2012/0223798 | A1 * | 9/2012 | Wei | H01C 1/028 336/200 |
| 2012/0241685 | A1 * | 9/2012 | Wu | C09D 11/52 252/511 |
| 2015/0024227 | A1 * | 1/2015 | Nabuurs | C08F 220/14 428/523 |
| 2016/0096980 | A1 * | 4/2016 | Wieneke | B32B 37/26 428/355 BL |

FOREIGN PATENT DOCUMENTS

| | | | |
|---|---|---|---|
| KR | 10-2005-0109634 | A | 11/2005 |
| KR | 10-2005-0114005 | A | 12/2005 |
| KR | 10-0535175 | B1 | 12/2005 |
| KR | 10-2011-0019755 | A | 2/2011 |
| KR | 10-2011-0063039 | A | 6/2011 |
| KR | 10-2011-0104247 | A | 9/2011 |
| KR | 10-1129251 | B1 | 3/2012 |
| KR | 10-1225759 | B1 | 1/2013 |
| WO | WO 2009147421 | * | 12/2009 |

* cited by examiner

MANUFACTURING METHOD OF PTC ELEMENT USING POLYMER AQUEOUS EMULSION CONDUCTIVE COMPOSITE, PTC ELEMENT MANUFACTURED BY MANUFACTURING METHOD, AND PLANAR HEATING ELEMENT INCLUDING PTC ELEMENT

BACKGROUND OF THE INVENTION

Field of the Invention

The present invention relates to a manufacturing method of a PTC (Positive Temperature Coefficient) element using a polymer aqueous emulsion conductive composite, a PTC (Positive Temperature Coefficient) element manufactured by the manufacturing method, and a planar heating element including the same. More particularly, the invention relates to a PTC element manufactured by producing a conductive composite using a polymer aqueous emulsion without using an organic solvent and by coating or dipping a substrate with the conductive composite. The invention relates to a heating element manufactured by attaching an electrode to a PTC element and laminating an insulating covering material on. Since a temperature of the planar heating element is controlled while heating, safety of the heating element is significantly improved, and a separate temperature control device is unnecessary, which derives economic advantages.

Description of the Related Art

As a heating element which converts electric energy into thermal energy, there are a 1-dimensional heating element such as a resistance line and a 2-dimensional heating element such as a planar heating element. There are various devices used to secure safety by cutting off electric connection when a temperature of a heating element is overheated equal to or higher than a predetermined temperature, and one of them is a PTC (Positive Temperature Coefficient) element that prevent overheating by disabling electric connection by increase of resistance when overheating, and by allowing electric connection by decrease of resistance when cooling again. A technique of elements with such a function is a very important technique for securing safety.

As disclosed in "MANUFACTURING METHOD OF PTC ELEMENT AND OVERHEATING PREVENTING SYSTEM OF PLANAR HEATING ELEMENT USING THE SAME" (Korean Registered Patent Publication No. 10-1129251, Patent Literature 1) applied and registered by the inventor of the invention, there is a compounding forming method of melting polymers in a high temperature, in a conventional manufacturing technique of a PTC element. That is, a technique of manufacturing a PTC element in a sheet shape by melting a mixture including polymers and a conductive agent at a high temperature higher than a melting point of polymers by 20° C. or higher was used.

A disadvantage of the compounding forming technique is that an energy cost is high as compared with a solution process of the invention to be described later since polymers have to be melted at a high temperature. In addition, since polymers are formed in a continuous shape in the sheet-shaped manufactured PTC element, resistance change characteristics having an influence on electric connection are significantly changed according to repeating of overheating and cooling of the heating element to be different from an initial state, and reversibility is significantly decreased as a disadvantage. That is, the characteristics of cutting off electric connection by increase of resistance when the heating element is overheated and a temperature thereof is raised, and allowing electric connection by decrease of resistance when the heating element is cooled have to be kept initial even in using for a long time, but there is a disadvantage that the characteristics deviate with the lapse of use time and it is difficult to actually apply them to a heating element in which overheating and cooling are repeated.

Meanwhile, in the conventional technique, manufacturing a PTC element includes (1) a step of melting and mixing a compounding composite of polymers and a conductive agent, (2) a step of forming electrodes on both faces of the composite, (3) a step of forming the electrode-formed composite to be a sheet with a thickness of 0.2 to 3 mm, (4) a step of irradiating the sheet with an electron beam with 10 to 320 Kev to be cross-linked, and (5) a step of annealing after the cross-linking, and economical efficiency is lowered since the manufacturing method goes through complicated and various steps.

As a conventional technique about a solution state of a PTC composite, there is "METHOD OF MANUFACTURING POLYMER PTC FIXED-TEMPERATURE HEATING INK" (Korean Registered Patent Publication No. 10-1225759, Patent Literature 2), in which polyester-based and polyolefin-based resin is used as a binder, and a multi-walled carbon nanotube is used as a conductive filler, but there is a disadvantage that an organic solvent harmful for environments and human bodies such as toluene and xylene is used as a solvent.

In addition, as a conventional technique about a method of manufacturing a planar PTC element, there is "CONDUCTIVE COMPOSITE FOR MANUFACTURING HIGH-TEMPERATURE PLANAR PTC ELEMENT, HIGH-TEMPERATURE PLANAR PTC ELEMENT USING THE SAME, MANUFACTURING METHOD THEREOF" (Korean Laid-Open Patent Publication No. 10-2005-0109634, Patent Literature 3), but a manufacturing process is complicated such as forming and hardening a conductive composite formed of a mixture of a silicon sealant, a conductive filler, a coupling agent, and a reinforcement, to be a desired form.

As a conventional technique of manufacturing a heating element using a PTC element, there are "CONDUCTIVE COMPOSITE FOR MANUFACTURING CARBON FLEXIBLE HEATING STRUCTURE, CARBON FLEXIBLE HEATING STRUCTURE USING THE SAME, AND MANUFACTURING METHOD THEREOF" (Korean Registered Patent Publication No. 10-0535175, Patent Literature 4) and "CURRENT CONTROL RESISTANCE HEATING COMPOSITE MATERIAL AND MANUFACTURING METHOD OF PTC HEATING ELEMENT USING COMPOSITE MATERIAL" (Korean Laid-Open Patent Publication No. 10-2005-0114005, Patent Literature 5), a manufacturing process is complicated such as hardening after forming in a desired shape.

In addition, as a conventional technique of manufacturing a heating element using a PTC element, in "MANUFACTURING METHOD OF PTC FLEXIBLE PLANAR HEATING ELEMENT USING URETHANE-BASED THERMOPLASTIC ELASTOMER MATERIAL" (Korean Laid-Open Patent Publication No. 10-2011-0104247, Patent Literature 6), a method of forming a heating portion by drying after screen-printing a polymer-type conductive carbon black paste on an urethane-based thermoplastic elastomer sheet surface in a form of a plurality of horizontal lines is disclosed. As the polymer-type conductive carbon black paste is manufactured by dissolving polyurethane-based resin in a methyl ethyl ketone solvent and using barium ferrite as a conductive filler, there is a disadvantage of using an organic solvent.

CITATION LIST

Patent Literature

Patent Literature 1: KR 10-1129251 (2012.03.15)
Patent Literature 2: KR 10-1225759 (2013.01.17)
Patent Literature 3: KR 10-2005-0109634 (2005.11.22)
Patent Literature 4: KR 10-0535175 (2005.12.02)
Patent Literature 5: KR 10-2005-0114005 (2005.12.05)
Patent Literature 6: KR 10-2011-0104247 (2011.09.22)

SUMMARY OF THE INVENTION

The invention for overcome the disadvantages described above is to provide a PTC element having good repeated reversal characteristics even in using for a long period by manufacturing a PTC element using a polymer aqueous emulsion conductive composite.

A thing in which polymers are dispersed in a particulate form in water or organic solvent is a polymer emulsion. An object of the invention is to provide, by applying a wet process technique of manufacturing a PTC element using a polymer aqueous emulsion solution not a compounding technique of using melted polymers, an eco-friendly manufacturing method using water as a solvent, in which various coating processes is applicable, a manufacturing process thereof is easy and simple to be low energy consumption and economical in manufacturing the PTC element.

Another object of the invention is to manufacture a PTC element by coating a substrate with a polymer aqueous emulsion conductive composite, printing a pattern on the substrate with the polymer aqueous emulsion conductive composite, or dipping and drying the substrate in the polymer aqueous emulsion conductive composite, and to provide a planar heating element manufacturing using the PTC element, specifically, a planar heating element having PTC characteristics (i.e., self temperature control characteristics).

In addition, the invention is to provide a planar heating element having PTC characteristics by coating or dipping and drying conductive yarn or non-conductive yarn with or in a polymer aqueous emulsion conductive composite, then attaching electrodes to a non-woven or textile PTC element manufactured using it, and laminating an insulating coating material on upper and lower faces.

According to an aspect of the invention to achieve the objects described above, there is provided a manufacturing method of a PTC element using a polymer aqueous emulsion conductive composite includes: (1) producing a polymer aqueous emulsion solution; (2) producing a polymer aqueous emulsion conductive composite by mixing the polymer aqueous emulsion solution with a conductive agent; and (3) producing a PTC element by coating a substrate with the polymer aqueous emulsion conductive composite, printing a pattern on the substrate with the polymer aqueous emulsion conductive composite, or dipping and drying the substrate in the polymer aqueous emulsion conductive composite, wherein the polymer aqueous emulsion solution includes, based on total 100 weight %: (1) an adhesive polymer of 30 to 70 weight %; (2) a cross-linking agent of 10 to 40 weight %; (3) an initiator of 0.5 to 1 weight %; and (4) the remaining water, and wherein the polymer aqueous emulsion conductive composite includes, based on total 100 weight %: (1) the polymer aqueous emulsion solution of 30 to 70 weight %; and (2) a conductive agent of 30 to 70 weight %.

According to another aspect of the invention to achieve the objects described above, there is provided a manufacturing method of a PTC element using a polymer aqueous emulsion conductive composite includes: (1) producing a polymer aqueous emulsion solution; (2) producing a polymer aqueous emulsion conductive composite by mixing the polymer aqueous emulsion solution with a conductive agent; (3) producing a fabric coated with the conductive composite by coating conductive yarn or non-conductive yarn with the polymer aqueous emulsion conductive composite, or dipping and drying the conductive yarn or the non-conductive yarn in the polymer aqueous emulsion conductive composite; and (4) producing a non-woven or textile PTC element using the fabric coated with the conductive composite, wherein the polymer aqueous emulsion solution includes, based on total 100 weight %: (1) an adhesive polymer of 30 to 70 weight %; (2) a cross-linking agent of 10 to 40 weight %; (3) an initiator of 0.5 to 1 weight %; and (4) the remaining water, and wherein the polymer aqueous emulsion conductive composite includes, based on total 100 weight %: (1) the polymer aqueous emulsion solution of 30 to 70 weight %; and (2) a conductive agent of 30 to 70 weight %.

Preferably, the adhesive polymer is one or more selected from ethylene butyl acrylate copolymer, ethylene vinyl acetate copolymer, polyethylene oxide, polyethylene, polypropylene, polyacrylonitrile, polyamide, polyester, syndiotactic polystyrene, polyketone, and cellulose.

Preferably, the cross-linking agent is one or more selected from divinyl benzene, diene monomer, trimethylolpropane trivinyl ether monomer, and vinyl trimethoxysilane monomer.

Preferably, the initiator is one or more selected from dicumyl peroxide, acetyl benzoyl peroxide, tert-butyl hydroperoxide, and diacetyl peroxide.

Preferably, the conductive agent is one or more selected from carbon powder (carbon black), graphite powder, carbon fiber, and carbon nanotube.

Preferably, the substrate includes one or more selected from a polymer resin film that is one or more selected from polyethylene terephthalate (PET) film, polyimide film, polyamide film, polyester film, polypropylene film, polyethylene film, polyvinyl chloride film, polyvinylidene chloride film, polycarbonate film, acetate cellulose film, acetate film, polyvinyl alcohol film, polystyrene film, polymer resin, and fluorine resin film, non-woven, textile, paper, slate, mud plate, woodblock, plate glass, plastic plate, cardboard, conductive polymer resin film, conductive non-woven, conductive textile, conductive paper, conductive slate, conductive mud plate, conductive woodblock, conductive plate glass, conductive plastic plate, and conductive cardboard.

Preferably, the non-conductive yarn is one or more fiber selected from polyester, acrylic of acrylonitrile of 50 to 100 weight %, acrylic including acrylonitrile 40 to 50 weight %, nylon, vinylon, PVA, polypropylene, polyethylene, vinylidene, polyvinyl chloride, polyvinylidene chloride, aramid, polystyrene, polychlal, benzoid, rayon, polynosic, cupra, acetate, triacetate, promix, polyfluoroethylene, cotton, flax, and ramie, and wherein the conductive yarn is one or more fiber selected from: a thing produced by mixing a fiber conductive material and non-conductive yarn; a thing produced by melting, mixing, and weaving conductive powder and polymer resin; metal yarn; a partially carbonized carbon fiber acquired at a yield of 25 to 70 weight % to the initial weight by carbonizing PAN-based carbon fiber or pitch-based carbon fiber in an inert atmosphere at a medium temperature of 600 to 1500° C.; a cotton yarn made by spinning the conductive yarn and the non-conductive yarn together; conductive yarn coated with a conductive material; and conductive yarn in which non-conductive yarn is a core material, an outside thereof is covered with a metal yarn to broaden a sectional area of current flow.

According to an aspect of the invention to achieve the objects described above, there is provided a PTC element using a polymer aqueous emulsion conductive composite is manufactured by the above manufacturing methods.

According to an aspect of the invention to achieve the objects described above, there is provided a planar heating element using a polymer aqueous emulsion conductive composite, configured by attaching a pair of electrodes to both ends of the PTC in parallel or attaching two or more pairs of electrodes to both ends and between both ends at a regular interval and laminating at least one insulating coating material on upper and lower faces of the PTC element.

Preferably, in the electrode, the non-conductive yarn formed of one or more fiber selected from the group consisting of polyester, acrylic (acrylonitrile that is a main component is equal to or more than 50%), acrylic (acrylonitrile that is a main component is 40 to 50%), nylon, vinylon, PVA, polypropylene, polyethylene, vinylidene, polyvinyl chloride, polyvinylidene chloride, aramid, polystyrene, polychlal, benzoid, rayon, polynosic, cupra, acetate, triacetate, promix, polyfluoroethylene, cotton, flax, and ramie is formed of a core fiber, and 2 to 5 plaited lines formed by plaiting 2 to 10 electric wires formed by winding one or more metal thin film line selected from a copper thin film and an aluminum thin film on the core fiber are plaited with one or more metal yarn selected from stainless yarn, nickel yarn, copper yarn, and steel yarn.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
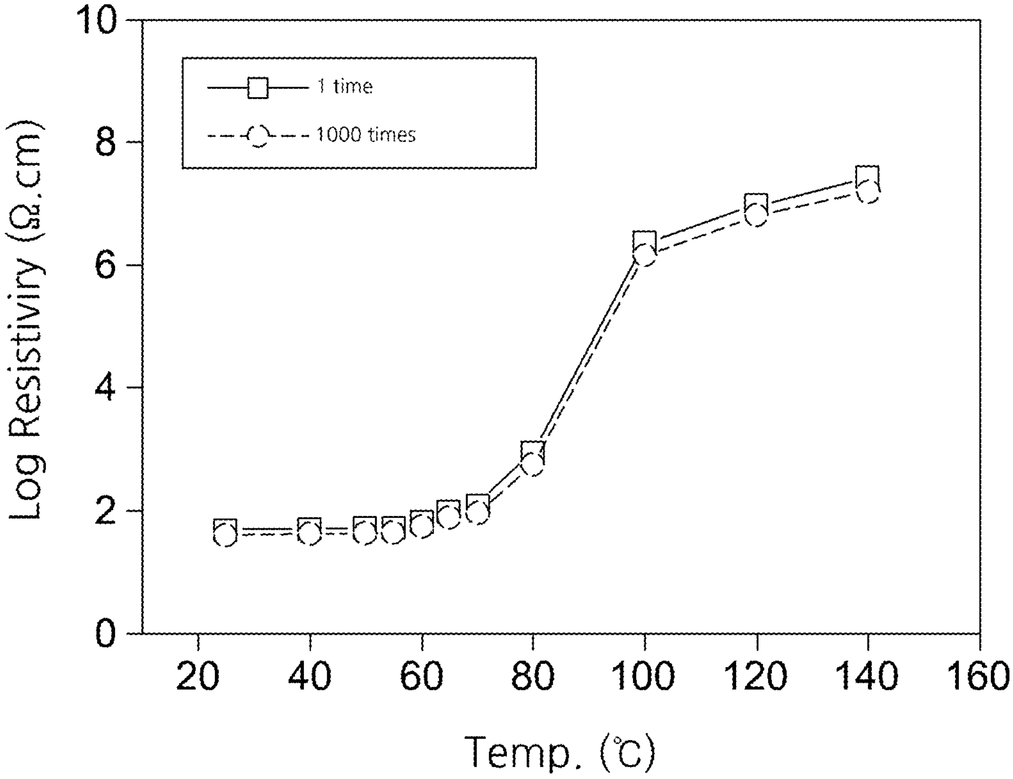
FIG. 1 is a graph illustrating characteristics of a PTC element manufactured using a polymer aqueous emulsion conductive composite according to Embodiment 1 of the invention.

Hereinafter, the invention will be described in more detail.

The invention is manufacturing a PTC element using a polymer aqueous emulsion conductive composite, and includes: (1) producing a polymer aqueous emulsion solution; (2) producing a polymer aqueous emulsion conductive composite by mixing the polymer aqueous emulsion solution with a conductive agent; and (3) producing a PTC element by coating a substrate with the polymer emulsion conductive composite, printing a pattern on the substrate with the polymer aqueous emulsion conductive composite, or dipping and drying the substrate in the polymer aqueous emulsion conductive composite.

A planar heating element is manufactured by attaching a pair of electrodes to both ends of the PTC element or attaching two or more pairs of electrodes to both ends and between both ends at a regular interval and laminating an insulating coating material on upper and lower faces of the PTC element.

The polymer aqueous emulsion solution includes a polymer, a cross-linking agent, an initiator, and water, and polymers used to manufacture the polymer aqueous emulsion solution may be anything having polar molecules as polymers having a high adhesive property to plastic and may be preferably one or more kind of resin selected from ethylene butyl acrylate copolymer, ethylene vinyl acetate copolymer, polyethylene oxide, polyethylene, polypropylene, polyacrylonitrile, polyamide, polyester, syndiotactic polystyrene, polyketone, and cellulose. More specifically, it is preferable to use polymer resin which acts on increase of a temperature in a relatively narrow temperature range as polymer resin suitable for 40 to 120° C. that is a heating design temperature of a PTC element and increases resistance of the composite, and the content of polymers in 100 weight % of the polymer aqueous emulsion solution is preferably 30 to 70 weight %. When the content of the polymer resin is less than 30 weight %, it is difficult to form a conductive film, and when the content is more than 70 weight %, the content of the conductive filler is relatively small, and resistance of the heating element is significantly increased at the normal temperature, which is not preferable.

The cross-linking agent included in the polymer aqueous emulsion solution may be anything if it is a multivinyl-based monomer including two or more vinyl groups which can be cross-linked by polymer polymerization, and is particularly preferably divinyl benzene, diene monomer, trimethylolpropane trivinyl ether monomer, and vinyl trimethoxysilane monomer. The polymer emulsion solution of 100 weight % preferably includes the cross-linking agent of 10 weight % to 40 weight %. When the content is equal or less than 10 weight %, the cross-linking reaction is difficult, and when the content is equal to or more than 40 weight %, a binder role is decreased and adhesion is decreased.

The initiator for the cross-linking reaction may be anything which is a peroxide-based compound, and is preferably dicumyl peroxide, acetyl benzoyl peroxide, tert-butyl hydroperoxide, diacetyl peroxide, or the like. The use amount in the polymer aqueous emulsion solution of 100 weight % is preferably in the range of 0.5 weight % to 1 weight %, when the use amount is less than 0.5 weight %, the initiation reaction is insufficient, and when the use amount is equal to or more than 1 weight %, conductivity of the PTC element at the normal temperature is high and intensity of PTC is decreased, which is not preferable.

In the polymer aqueous emulsion solution of 100 weight %, the remaining amount with respect to the content occupied by the adhesive polymer, the cross-linking agent, and the initiator is composed of water.

In this case, the remaining water is more preferably in the range of 20 to 80 weight % in the total 100 weight %.

The reason is that, when the water is equal to or less than 20 weight %, it is difficult to make the polymer aqueous emulsion conductive composite due to high viscosity, and when the water is equal to or more than 80 weight %, the polymer aqueous emulsion conductive composite is dilute, a long drying time is necessary, and a coating film deteriorates.

The polymer aqueous emulsion conductive composite is produced by mixing the produced polymer aqueous emulsion solution with the conductive agent. In the polymer aqueous emulsion conductive composite of 100 weight %, the polymer aqueous emulsion solution is preferably 30 to 70 weight %. When the content is equal to or less than 30 weight %, settlement of the conductive agent becomes poor, and when the content is equal to or more than 70 weight %, the conductivity is lowered.

The conductive agent used in the invention may be anything which is a substance having high conductivity, and is particularly preferably carbon powder (carbon black), graphite powder, carbon fiber, carbon nanotube, and metal powder. Particularly, it is more preferable to use one or more kind of conductive carbon selected from an average particle size of 70 to 300 nm. A selection condition of carbon for representing good PTC characteristics are that PTC intensity gets higher as a particle size gets larger and a surface area relatively gets smaller. When the average particle diameter is less than 70 nm, conductivity at the normal temperature is good but the PTC intensity is insufficient, and when the average particle diameter is equal to or more than 300 nm, the PTC intensity is good but the conductivity at the normal temperature is decreased, which is not preferable. In the polymer aqueous emulsion conductive composite of 100 weight %, the conductive agent is preferably 30 to 70 weight %. When the content of the conductive agent is less than 30 weight %, the conductivity at the normal temperature is insufficient, and when the content is more than 70 weight %, the content of the polymer resin is relatively small and it is difficult to form a film, which is not preferable.

The PTC element may be manufactured by a method of coating a substrate with the polymer aqueous emulsion conductive composite, printing a pattern on the substrate with the polymer aqueous emulsion conductive composite, or dipping and drying the substrate in the polymer aqueous emulsion conductive composite.

The substrate includes (1) a non-conductive substrate and (2) a conductive substrate, and (1) the conductive substrate includes ① a flexible non-conductive substrate and ② an inflexible non-conductive substrate. (2) The conductive substrate includes ③ a flexible conductive substrate and ④ a inflexible conductive substrate.

① The flexible non-conductive substrate includes flexible polymer resin film, non-woven, paper, and the like, and ② the inflexible non-conductive substrate includes slate, mud plate, woodblock, plate glass, plastic plate, cardboard, and the like. ③ The flexible conductive substrate is a substrate in which conductivity is applied the flexible non-conductive substrate, and includes polymer resin film, conductive non-woven, conductive textile, conductive paper, and the like, and ④ the inflexible conductive substrate is a substrate in which conductivity is applied to the inflexible non-conductive substrate, and includes conductive slate, conductive mud plate, conductive woodblock, conductive plate glass, conductive plastic plate, conductive cardboard, and the like.

The polymer resin film includes polyethylene terephthalate (PET) film, polyimide film, polyamide film, polyester film, polypropylene film, polyethylene film, polyvinyl chloride film, polyvinylidene chloride film, polycarbonate film, acetate cellulose film, acetate film, polyvinyl alcohol film, polystyrene film, fluoride resin film, and the like.

Figure 3:
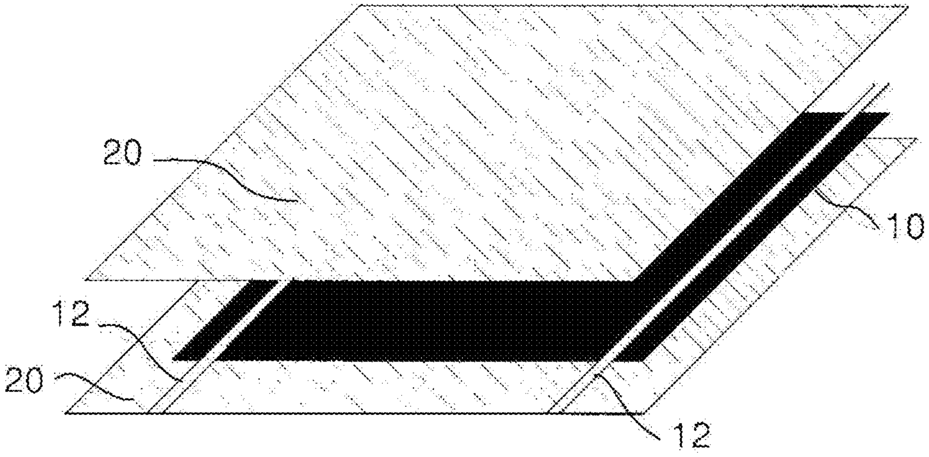
FIG. 3 is a schematic exploded perspective view of a planar heating element according to an embodiment of the invention.

A planar heating element manufactured using the PTC element of the invention as a heating element will be described with reference to FIG. 3.

The planar heating element according to the invention is manufactured by attaching electrodes 12 to the PTC element 10, laminating one or more laminating coating sheet (insulating coating material) 20 on each of upper and lower faces of the PTC element 10 to which the electrodes 12 are attached, and then pressurizing and heating it by a laminator.

In this case, generally the electrodes 12 may be attached to both ends of the PTC element 10 in parallel in two rows, or two or more electrodes may be attached to both ends and between both ends at a regular interval. Copper foil, copper tape, aluminum foil, silver foil, silver tape, or the like with a width of about 10 mm is mainly used as the electrodes. The electrodes may be formed by printing metal paste or conductive ink. The insulating coating material 20 is preferably glass epoxy prepreg. Total two, four, six or more sheets of them are laminated on the upper and lower faces of the PTC element 10 according to a desired thickness, and then are attached by pressurizing and heating of a hot press machine. As the pressurizing and heating condition, it is preferable to gradually raise a temperature for two hours from the normal temperature to 180° C. at a pressure of 3 to 10 kg/cm$^2$.

A planar heating element manufactured using the PTC element of the invention as a heating element may be manufactured in another manner. A non-woven or textile PTC element is manufactured by coating conductive yarn or non-conductive yarn with a polymer aqueous emulsion conductive composite or dipping and drying the conductive yarn or the non-conductive yarn in the polymer aqueous emulsion conductive composite, and then using it. A planar heating element is manufactured by attaching electrodes to the PTC element, laminating one or more sheet of insulating coating material on each of upper and lower faces, and then pressurizing and heating it by a laminator.

The non-conductive yarn used in the invention is one or more fiber selected from the group consisting of synthetic fiber, regenerated fiber, semi-synthetic fiber, and natural fiber, such as polyester, acrylic (acrylonitrile that is the main component is equal to or more than 50%), acrylic (acrylonitrile that is the main component is 40 to 50%), nylon, vinylon, PVA, polypropylene, polyethylene, vinylidene, polyvinyl chloride, polyvinylidene chloride, aramid, polystyrene, polychlal, benzoid, rayon, polynosic, cupra, acetate, triacetate, promix, polyfluoroethylene, cotton, flax, and ramie. The non-conductive yarn used in the invention may be anything such as circular cross-sectional fiber, modified cross-sectional fiber, hollow fiber, modified hollow fiber, conjugate fiber, and mixing yarn.

The conductive yarn used in the invention may be manufactured by plaiting a fiber conductive material and the non-conductive yarn, and the fiber conductive material is carbon fiber, metal yarn, and the like. The conductive yarn may be manufactured by melting, mixing, and spinning conductive powder such as carbon black, graphite powder, carbon nanotube or metal powder, with the polymer resin. The metal yarn itself may be used as the conductive yarn.

The conductive yarn used in the invention may be as follows. There is partially carbonized carbon fiber acquired by a yield of 25 to 70 weight % to the initial weight by carbonizing PAN-based carbon fiber or pitch-based carbon fiber in an inert atmosphere at a medium temperature of 600 to 1500° C. Conductive carbonized fiber such as carbon fiber, graphite fiber, medium-temperature carbonized fiber (partially carbonized carbon fiber) and activated carbon fiber, or blended yarn made by blending conductive yarn of 10 to 90 weight % and non-conductive yarn of 10 to 90 weight % is also the conductive yarn used in the invention. There is conductive yarn manufactured by applying or dipping conductive ink such as carbon ink and metal paste to non-conductive yarn such as glass fiber, that is, conductive yarn coated with a conductive material is also used in the invention.

Figure 4:
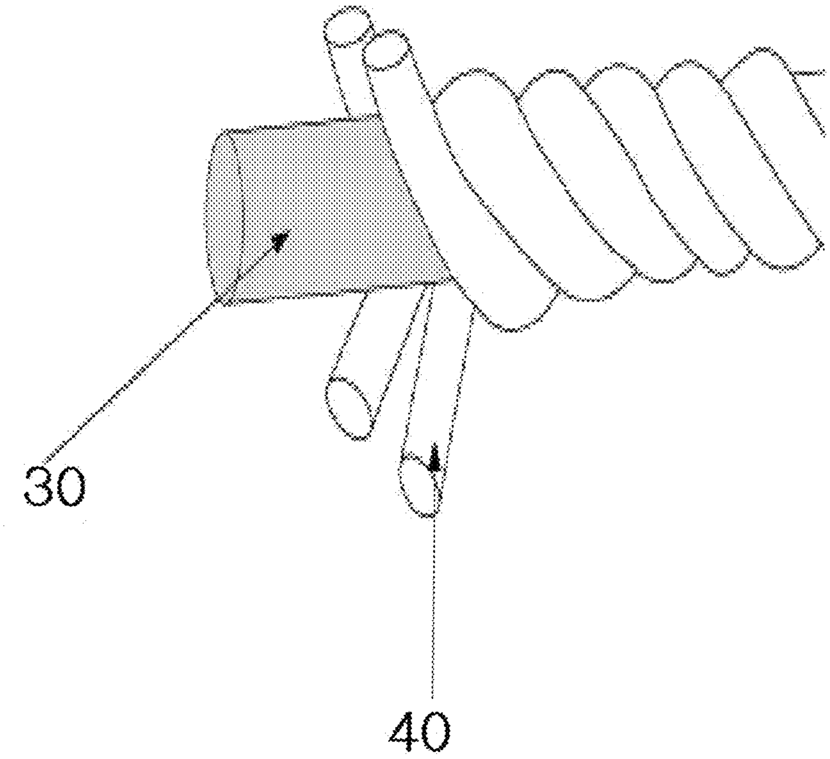
FIG. 4 is a schematic diagram illustrating conductive yarn according to an embodiment of the invention.

Another type of conductive yarn is shown in FIG. 4. There is conductive yarn in which normal yarn 30 that is non-conductive yarn is a core material, and the outside thereof is covered with metal yarn 40, thereby broadening a cross-sectional area.

Non-woven is manufactured using the conductive yarn or non-conductive yarn or mixing and using them. The non-woven may be manufactured using the conventional technique such as a wet manufacturing method and a dry manufacturing method. As a method of manufacturing the textile using the conductive yarn or non-conductive yarn or mixing and using them, there is a method such as blending, mixing, plaiting, union, and cross-weaving.

The electrodes used in the non-woven or textile PTC element may be the electrodes described above, but the following is preferable. Using non-conductive fiber such as polystyrene fiber as a core material, and a metal thin film wire such as copper thin film and aluminum thin film is densely wound on the core material fiber, to make an electric wire. Since such an electric wire is thin and weak, there is no durability, and it is difficult to allow current to flow. In order to improve the durability and to increase the current amount, two to ten electric wires described above are plaited. In order to further improve the durability, the two to five plaited electric wires, and one or more metal yarns selected from stainless yarn, nickel yarn, copper yarn, and steel yarn are plaited again, to manufacture an electrode. The electrode manufactured in such a manner has good flexibility, and naturally moves together even when it is attached to the textile PTC element, and the electrode is not cut even when an operation of folding and unfolding is repeated many times.

Hereinafter, the invention will be described in detail with reference to embodiments.

[Production Example 1] <Production of Polymer Aqueous Emulsion Solution 1>

A polymer aqueous emulsion solution was produced using an ethylene vinyl acetate copolymer of 35 weight % including acetate of 30 weight %, divinylbenzene of 14 weight % as a monomer that is a cross-linking agent, dicumyl peroxide of 1 weight % as an initiator, and water of 50 weight %.

[Production Examples 2 to 6] <Production of Polymer Aqueous Emulsion Solutions 2 to 6>

As shown in the following Table 1, polymer aqueous emulsion solutions 2 to 6 were produced by the same method as that of Production Example 1 while varying a composition ratio.

TABLE 1

Composition Ratio of Polymer Aqueous Emulsion Solution

| | Production Example 2 | Production Example 3 | Production Example 4 | Production Example 5 | Production Example 6 |
|---|---|---|---|---|---|
| Adhesive Polymer | 45 weight % | 55 weight % | 65 weight % | 68 weight % | 30 weight % |
| Cross-linking Agent | 20 weight % | 17 weight % | 14 weight % | 10 weight % | 37 weight % |
| Initiator | 0.5 weight % | 0.8 weight % | 0.7 weight % | 0.6 weight % | 0.9 weight % |
| Water | 34.5 weight % | 27.2 weight % | 20.3 weight % | 21.4 weight % | 32.1 weight % |

Adhesive polymer polyester was used in Production Example 2, polyethylene oxide was used in Production Example 3, polyethylene was used in Production Example 4, polypropylene was used in Production Example 5, and polyacrylonitrile was used in Production Example 6.

As a cross-linking agent, divinylbenzene was used in Production Example 2, diene monomer was used in Production Example 3, trimethylolpropane trivinyl ether was used in Production Example 4, vinyltrimethoxysilane was used in Production Example 5, and trimethylolpropane trivinyl ether was used in Production Example 6.

As an initiator, acetyl benzoyl peroxide was used in Production Example 2, dicumyl peroxide was used in Production Example 3, tert-butyl hydroperoxide was used in Production Example 4, diacetyl peroxide was used in Production Example 5, and dicumyl peroxide was used in Production Example 6.

Embodiment 1

A polymer aqueous emulsion conductive composite containing the polymer aqueous emulsion solution of 70 weight % produced in Production Example 1 and carbon fiber of 30 weight % as a conductive agent was produced, and a PTC element was manufactured by coating polyethylene terephthalate (PET) film with a thickness of 0.1 mm using a doctor blade and drying it at 85° C.

In the course of drying, the initiator is resolved, a radical is formed, a cross-linking reaction is induced, a polymer network structure is formed, deformation of melted copolymers of ethylene vinyl acetate is suppressed, and characteristics of the PTC element are kept even in the course of repeated overheating and cooling.

FIG. 1 shows that a resistance rate according to temperature is measured repeatedly using a PTC element 1000 times, and as shown in FIG. 1, it can be known that PTC characteristics are satisfactorily kept even in the course of repeatedly overheating and cooling 1000 times. Such characteristics are very important in actual application of the PTC element.

Comparative Example 1

A PTC element of Comparative Example 1 was manufactured in the same method as that of Embodiment 1 disclosed in Korean Patent No. 10-1129251 that is Patent Literature 1. That is, as crystalline polymer resin, ethylene butyl acrylate copolymer of 35%, carbon black of 64.5 weight % with a particle size of 300 nm, and antioxidant of 0.5 weight % were melted and mixed to manufacture a PTC element by a compounding forming method, in which a thickness was 3 mm, a size was 5 mm×10 mm, and it was irradiated with an electron beam of 200 keV to be cross-linked.

Figure 2:
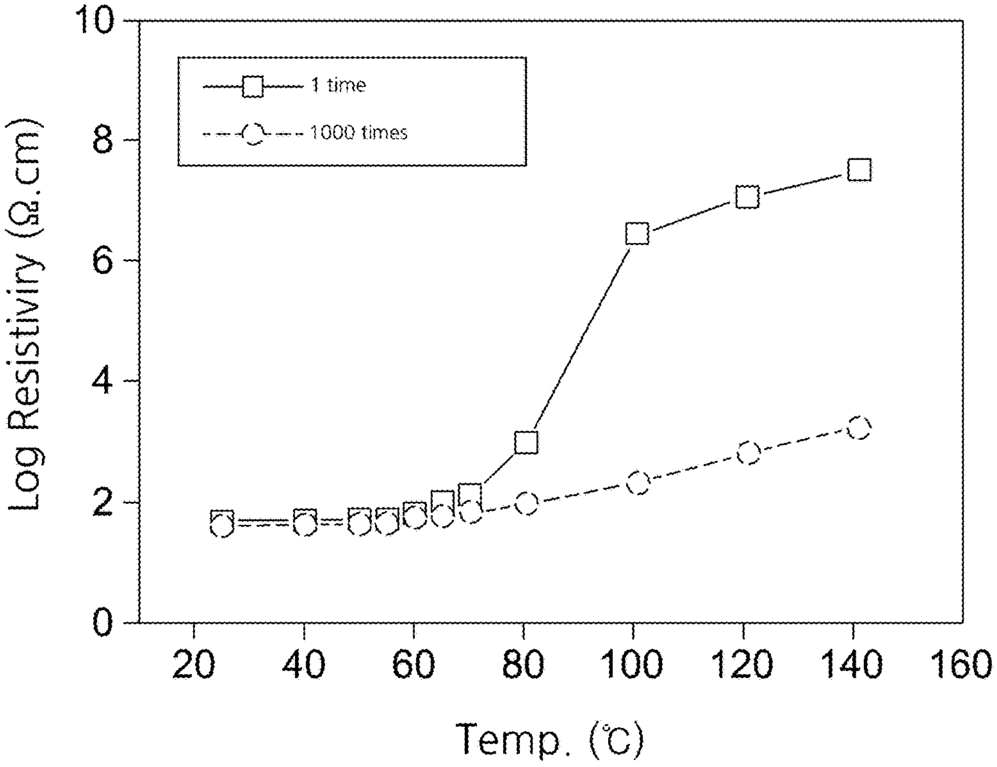
FIG. 2 is a graph illustrating characteristics of a PTC element manufactured using a polymer melting compounding technique according to Comparative Example 1.

As shown in FIG. 2, characteristics of the PTC element of Comparative Example 1 were decreased after repeatedly using 1000 times.

Embodiment 2

A planar heating element was manufactured as follows using the PTC element manufactured by the same method as that of Embodiment 1 as a heating element. As shown in FIG. 3, foil electrodes 12 of with a width of 10 mm were attached in two line in parallel at both ends of the PTC element 10 (40 cm×30 cm) of Embodiment 1, one insulating coating material 20 was laminated on each of upper and lower faces of the PTC element 10 to which the electrodes 12 are attached, and it was attached by pressurizing and heating by a laminator. As the insulating coating material 20, glass epoxy prepreg was laminated with a thickness of 3 mm. As the pressurizing and heating condition, a temperature was gradually raised for two hours from the normal temperature to 180° C. at a pressure of 3 to 10 kg/cm$^2$.

Electric wires were connected to the electrodes 12 of the planar heating element manufactured as described above, and heat was generated using direct current electricity of 12 V. The heating temperature was 82° C. as an average value of values measured by dividing a heating area into 32 equal parts, and a temperature deviation was uniform with ±5° C.

Embodiment 3

Oxidized polyacrylonitrile (oxy-PAN) fiber (Japan Teijin Co., Ltd.) of 1250 g with a length of 7 cm was subjected to a heat treatment in an electric carbonizing furnace of a nitrogen atmosphere for 30 minutes at 500° C., and then was carbonized at a medium temperature for 1 hour at 800° C., thereby obtaining partially carbonized PAN-based carbon fiber of 800 g.

The obtained partially carbonized PAN-based carbon fiber of 1 cm was coated with silver paste, then resistance was measured on the silver paste electrode by a resistance tester (Hewlett-Packard, HP34401A), power consumption was measured with voltage fixed to 220 V, a predetermined point was set, and then a heating temperature was measured by an infrared t thermometer (Japan SATO, SK-870011). It was confirmed that the produced partially carbonized PAN-based carbon fiber was conductive yarn representing resistance of 0.8 kΩ/m$^2$ and power consumption of 850 (watt/m$^2$), and representing a heating temperature of 75° C.

A polymer aqueous emulsion conductive composite containing the polymer aqueous emulsion solution of 55 weight % produced in Production Example 2 and carbon powder of 45 weight % as a conductive agent was produced. Conductive composite coated conductive yarn was produced by dipping and drying the partially carbonized PAN-based carbon fiber in the polymer aqueous emulsion conductive composite.

The conductive composite coated conductive yarn of 500 g and aramid fiber of 500 g that is fire-resistant fiber (low melting fiber) were mixed in a mixer, it was separated one by one by a carding machine to be arranged in parallel, they were collected and made into slivers, and the slivers were arranged in a non-woven form of one direction, and thermally attached at 150° C., thereby manufacturing a non-woven PTC element.

A planar heating element was manufactured by the same method as that of Embodiment 2 using the non-woven PTC element (40 cm×30 cm) as a heating element, and the following was used as electrodes.

Polystyrene fiber that is non-conductive yarn was used as a core material, a copper thin film wire was densely wound on the core material to make an electric wire, and then five electric wires made in such a manner were plaited. Two plaited electric wires and stainless yarn were plaited again to manufacture an electrode. When voltage of 220 V was applied to the planar heating element, resistance of 45Ω was measured, and a heating temperature of 87° C. was represented.

Embodiment 4

Conductive yarn of 12 weight % that is the partially carbonized PAN-based carbon fiber produced by the same method as that of Embodiment 3 except that a heat treatment temperature was 1500° C. and aramid fiber of 88 weight % that is non-conductive yarn were mixed in a mixer at this rate, it was separated one by one by a carding machine to be arranged in parallel, then they were collected and made into slivers, twist was applied to the slivers, and 30 thin yarns were spun to produce blended yarn.

A polymer aqueous emulsion conductive composite containing a polymer aqueous emulsion conductive composite containing the polymer aqueous emulsion solution of 40 weight % produced in Production Example 3, carbon powder of 20 weight % as a conductive agent, and copper powder 40 weight % was produced. Conductive composite coated conductive yarn was produced by dipping and drying the blended yarn in the polymer aqueous emulsion conductive composite. A textile PTC element was manufactured by weaving (union) to be warp density 45E/IN and weft density 32EA/IN using the conductive composite coated conductive yarn.

A planar heating element was manufactured by the same method as that of Embodiment 2 using the textile PTC element (40 cm×30 cm) as a heating element, and the same as Embodiment 3 was used as electrodes. When voltage of 220 V was applied to the planar heating element, resistance of 307Ω was measured, and a heating temperature of 43° C. was represented.

Embodiment 5

Conductive yarn of 87 weight % that is the partially carbonized PAN-based carbon fiber produced by the same method as that of Embodiment 3 except that a heat treatment temperature was 600° C. and aramid fiber of 13 weight % that is non-conductive yarn were mixed in a mixer at this rate, it was separated one by one by a carding machine to be arranged in parallel, then they were collected and made into slivers, twist was applied to the slivers, and 30 thin yarns were spun to produce blended yarn.

A polymer aqueous emulsion conductive composite containing the polymer aqueous emulsion solution of 68 weight % produced in Production Example 4 and graphite powder of 10 weight % and copper powder 22 weight % as a conductive agent was produced. Conductive composite coated conductive yarn was produced by dipping and drying the blended yarn in the polymer aqueous emulsion conductive composite. A textile PTC element was manufactured by weaving (union) to be warp density 50E/IN and weft density 35EA/IN using the conductive composite coated conductive yarn.

A planar heating element was manufactured by the same method as that of Embodiment 4 using the textile PTC element (40 cm×30 cm) as a heating element. When voltage of 220 V was applied to the planar heating element, resistance of 95Ω was measured, and a heating temperature of 98° C. was represented.

Embodiment 6

Conductive yarn was produced by applying and drying carbon ink to glass fiber. A polymer aqueous emulsion conductive composite containing the polymer aqueous emulsion solution of 32 weight % produced in Production Example 5, and carbon fiber of 12 weight %, carbon powder of 16 weight %, and nickel powder of 40 weight % as a conductive agent was produced. Two kinds of conductive composite coated conductive yarn were produced by dipping and drying Flax that is the conductive yarn and the non-conductive yarn.

Two kinds of the conductive composite coated conductive yarn of each 225 g and aramid fiber of 550 g that is fire-resistant fiber (low melting fiber) were mixed in a mixer, it was separated one by one by a carding machine to be arranged in parallel, they were collected and made into slivers, and the slivers were arranged in a non-woven form of one direction, and thermally attached at 150° C., thereby manufacturing a non-woven PTC element.

A planar heating element was manufactured by the same method as that of Embodiment 4 using the non-woven PTC element (40 cm×30 cm) as a heating element. When voltage of 220 V was applied to the planar heating element, resistance of 86Ω was measured, and a heating temperature of 107° C. was represented.

Embodiment 7

A conductive cardboard was manufactured by dipping and drying a cardboard in carbon ink. A polymer aqueous emulsion conductive composite containing the polymer aqueous emulsion solution of 50 weight % produced in Production Example 6, and carbon fiber of 15 weight %, carbon powder of 15 weight %, and nickel powder of 20 weight % as a conductive agent was produced. A PTC element was manufactured by dipping and drying the conductive cardboard in the polymer aqueous emulsion conductive composite.

A planar heating element was manufactured by the same method as that of Embodiment 2 using the cardboard PTC element (40 cm×30 cm) as a heating element. When voltage of 220 V was applied to the planar heating element, resistance of 79Ω was measured, and a heating temperature of 116° C. was represented.

According to the invention, in a PTC element and manufacturing a planar heating element using it, a wet coating process or a wet dipping process is possible by using a polymer aqueous emulsion conductive composite, as compared with a conventional technique of using a compounding forming technique using a polymer melted solution at a high temperature, various patterning and filming processes of a plastic film are easy. In addition, since a sheet forming process, a cross-linking process based on an electron beam irradiation, and an annealing process are not necessary, there is an advantage that a process is simple and economical.

In addition, it is possible to embody a reversible durable PTC element in which the initial characteristics are kept even when repeating overheating and cooling for a long time.

While the present invention has been described with respect to the specific embodiments, it will be apparent to those skilled in the art that various changes and modifications may be made without departing from the spirit and scope of the invention as defined in the following claims.

What is claimed is:

1. A manufacturing method of a positive temperature coefficient (PTC) planar heating element using a polymer aqueous emulsion conductive composite, comprising:

(1) producing a polymer aqueous emulsion solution;

(2) producing a polymer aqueous emulsion conductive composite by mixing the polymer aqueous emulsion solution with a conductive agent; and (3) producing a PTC planar heating element by coating a substrate with the polymer aqueous emulsion conductive composite, printing a pattern on the substrate with the polymer aqueous emulsion conductive composites, or dipping the substrate in the polymer aqueous emulsion conductive composite and drying the substrate coated with the polymer aqueous emulsion conductive composite, wherein the polymer aqueous emulsion solution includes, based on total 100 weight %:

an adhesive polymer of 30 to 70 weight %;

a cross-linking agent of 10 to 40 weight %;

an initiator of 0.5 to 1 weight %; and the remaining water, and wherein the polymer aqueous emulsion conductive composite includes, based on total 100 weight %:

the polymer aqueous emulsion solution of 30 to 70 weight %; and a conductive agent of 30 to 70 weight %.

2. The manufacturing method as claimed in claim 1, wherein the adhesive polymer is one or more selected from ethylene butyl acrylate copolymer, ethylene vinyl acetate copolymer, polyethylene oxide, polyethylene, polypropylene, polyacrylonitrile, polyamide, polyester, syndiotactic polystyrene, polyketone, and cellulose.

3. The manufacturing method as claimed in claim 1, wherein the cross-linking agent is one or more selected from divinyl benzene, diene monomer, trimethylolpropane trivinyl ether monomer, and vinyl trimethoxysilane monomer.

4. The manufacturing method as claimed in claim 1, wherein the initiator is one or more selected from dicumyl peroxide, acetyl benzoyl peroxide, tert-butyl hydroperoxide, and diacetyl peroxide.

5. The manufacturing method as claimed in claim 1, wherein the conductive agent is one or more selected from carbon powder (carbon black), graphite powder, carbon fiber, and carbon nanotube.

6. The manufacturing method as claimed in claim 1, wherein the substrate includes one or more selected from a polymer resin film that is one or more selected from polyethylene terephthalate (PET) film, polyimide film, polyamide film, polyester film, polypropylene film, polyethylene film, polyvinyl chloride film, polyvinylidene chloride film, polycarbonate film, acetate cellulose film, acetate film, polyvinyl alcohol film, polystyrene film, polymer resin, and fluorine resin film, non-woven, textile, paper, slate, mud plate, woodblock, plate glass, plastic plate, cardboard, conductive polymer resin film, conductive non-woven, conductive textile, conductive paper, conductive slate, conductive mud plate, conductive woodblock, conductive plate glass, conductive plastic plate, and conductive cardboard.

7. A manufacturing method of a positive temperature coefficient (PTC) element using a polymer aqueous emulsion conductive composite, comprising:

(1) producing a polymer aqueous emulsion solution;

(2) producing a polymer aqueous emulsion conductive composite by mixing the polymer aqueous emulsion solution with a conductive agent;

(3) producing a fabric coated with the conductive composite by coating conductive yarn or non-conductive yarn with the polymer aqueous emulsion conductive composite, or dipping the conductive yarn or the non-conductive yarn in the polymer aqueous emulsion conductive composite and drying the conductive yarn or the non-conductive yarn coated with the polymer aqueous emulsion conductive composite; and (4) producing a non-woven or textile PTC element using the fabric coated with the conductive composite, wherein the polymer aqueous emulsion solution includes, based on total 100 weight %:

an adhesive polymer of 30 to 70 weight %;

a cross-linking agent of 10 to 40 weight %;

an initiator of 0.5 to 1 weight %; and the remaining water, and wherein the polymer aqueous emulsion conductive composite includes, based on total 100 weight %:

the polymer aqueous emulsion solution of 30 to 70 weight %; and a conductive agent of 30 to 70 weight %.

8. The manufacturing method as claimed in claim 7, wherein the adhesive polymer is one or more selected from ethylene butyl acrylate copolymer, ethylene vinyl acetate copolymer, polyethylene oxide, polyethylene, polypropylene, polyacrylonitrile, polyamide, polyester, syndiotactic polystyrene, polyketone, and cellulose.

9. The manufacturing method as claimed in claim 7, wherein the cross-linking agent is one or more selected from divinyl benzene, diene monomer, trimethylolpropane trivinyl ether monomer, and vinyl trimethoxysilane monomer.

10. The manufacturing method as claimed in claim 7, wherein the initiator is one or more selected from dicumyl peroxide, acetyl benzoyl peroxide, tert-butyl hydroperoxide, and diacetyl peroxide.

11. The manufacturing method as claimed in claim 7, wherein the conductive agent is one or more selected from carbon powder (carbon black), graphite powder, carbon fiber, and carbon nanotube.

12. The manufacturing method as claimed in claim 7, wherein the non-conductive yarn is one or more fiber selected from polyester, acrylic of acrylonitrile of 50 to 100 weight %, acrylic including acrylonitrile 40 to 50 weight %, nylon, vinylon, PVA, polypropylene, polyethylene, vinylidene, polyvinyl chloride, polyvinylidene chloride, aramid, polystyrene, polychlal, benzoid, rayon, polynosic, cupra, acetate, triacetate, promix, polyfluoroethylene, cotton, flax, and ramie, and wherein the conductive yarn is one or more fiber selected from:

a thing produced by mixing a fiber conductive material and non-conductive yarn;

a thing produced by melting, mixing, and weaving conductive powder and polymer resin;

metal yarn;

a partially carbonized carbon fiber acquired at a yield of 25 to 70 weight % to the initial weight by carbonizing PAN-based carbon fiber or pitch-based carbon fiber in an inert atmosphere at a medium temperature of 600 to 1500° C.;

a cotton yarn made by spinning the conductive yarn and the non-conductive yarn together;

conductive yarn coated with a conductive material; and conductive yarn in which non-conductive yarn is a core material, an outside thereof is covered with a metal yarn to broaden a sectional area of current flow.

* * * * *